United States Patent [19]
Tanaka et al.

[11] 3,975,606
[45] Aug. 17, 1976

[54] MICROWAVE OVEN WITH UNIFORM ELECTRIC FIELD DISTRIBUTION

[75] Inventors: Junzo Tanaka, Fujiidera; Haruo Matsushima; Toyotsugu Hatagawa, both of Yamatokoriyama, all of Japan

[73] Assignee: Matsushita Electric Industrial Co., Ltd., Japan

[22] Filed: Dec. 16, 1974

[21] Appl. No.: 533,077

[30] Foreign Application Priority Data
Dec. 18, 1973  Japan............................. 48-142863
Dec. 18, 1973  Japan............................. 48-142864
Dec. 18, 1973  Japan............................. 48-142865

[52] U.S. Cl........................................... 219/10.55 F
[51] Int. Cl.².......................................... H05B 9/06
[58] Field of Search............... 219/10.55 F, 10.55 D

[56] References Cited
UNITED STATES PATENTS

| | | | |
|---|---|---|---|
| 2,920,174 | 1/1960 | Haagensen............ | 219/10.55 D UX |
| 3,643,055 | 2/1972 | Suzuki et al................... | 219/10.55 F |
| 3,764,770 | 10/1973 | Saad et al...................... | 219/10.55 F |
| 3,798,404 | 3/1974 | Simon et al................... | 219/10.55 F |

OTHER PUBLICATIONS

Puschner, H. Heating Microwaves, Microwaves, Philips Technical Librarry, Springer-Verlag N.Y. Inc., 1966, pp. 176-182.

*Primary Examiner*—Arthur T. Grimley
*Attorney, Agent, or Firm*—Stevens, Davis, Miller & Mosher

[57] ABSTRACT

A microwave oven with an improved electric field distribution in the oven is provided. By properly establishing the position of a high frequency oscillator when it is directly affixed to a heating cavity or the position of a feeding opening when the feed through a wave guide is employed, with respect to the dimension of the heating cavity, the electric field distribution is improved and the efficiency is enhanced.

7 Claims, 11 Drawing Figures

MICROWAVE OVEN WITH UNIFORM ELECTRIC FIELD DISTRIBUTION

The present invention relates to a microwave oven and more particularly to a microwave oven with an improved electric field distribution in the oven.

In the past the oven dimensions of a high frequency-heated cooking apparatus have been determined in the following manner:

1. The oven dimensions are determined based on the dimensions of dishes, tablewares or the like actually used.
2. The oven dimensions are selected such that the length of one side thereof does not match an integral multiple of a quarter wavelength considering the fact that it is preferable for better electric field distribution in the oven not to produce a standing wave in the oven.
3. The oven dimensions are determined such that the number of resonant modes produced in the oven within the frequency variation range during the operation of a magnetron increases.

When the considerations (1) and (2) or (1) and (3) are combined, it has been proved that the ratio of the oven output $P_o$ to the magnetron input $P_{mag}$ ($P_o/P_{mag}$ (hereinafter referred to as the conversion efficiency) is relatively high but the electric field distribution is not satisfactory. It has also been known that an improved electric field distribution could be provided by mounting magnetrons at those positions in the oven which are laterally and longitudinally symmetrical, but the conversion efficiency was low when the oven dimensions according to the above considerations were used and in actual design a cumbersome procedure of sequentially changing the size and mounting position of a reflecting plate to find an optimum position has been required.

It is a primary object of the present invention to prevent decrease in the conversion efficiency caused when a magnetron is mounted at the position in the oven which is laterally and longitudinally symmetrical and to improve the electric field distribution in the oven.

It is another object of the present invention to eliminate the mounting of a reflecting plate mode converter or the like in the oven, which has been necessary in the prior art, to thereby provide a high frequency-operated cooking apparatus of high efficiency and economy.

In the prior art oven a disadvantage has been encountered in that when an electric field near the center was increased the lateral and longitudinal balances were lost and when the lateral and longitudinal balances were adjusted the electric field of the electromagnetic field at the center was decreased. Thus, it is another object of the present invention to provide an ideal electric field distribution exhibiting no such disadvantage.

In the prior art oven, a precise dimension was required because the non-uniformity in the vertical dimension significantly influenced the characteristics of the oven. It is a further object of the present invention to eliminate the influence thereby and to allow selection of any dimension.

The above and other objects, features and advantages of the invention will become more apparent from the following detailed description of preferred embodiments of the invention when taken in conjunction with the accompanying drawings, in which.

Figure 1:
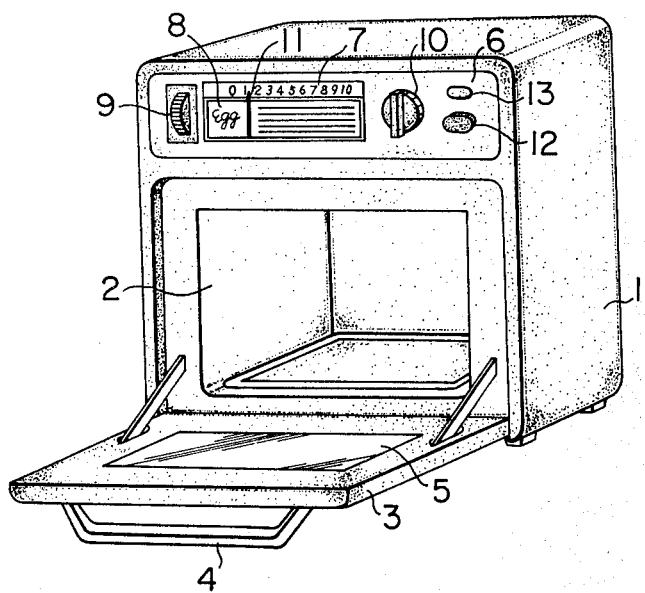
FIG. 1 shows an overall perspective view of a microwave oven with a door in its open position.
Figure 2:
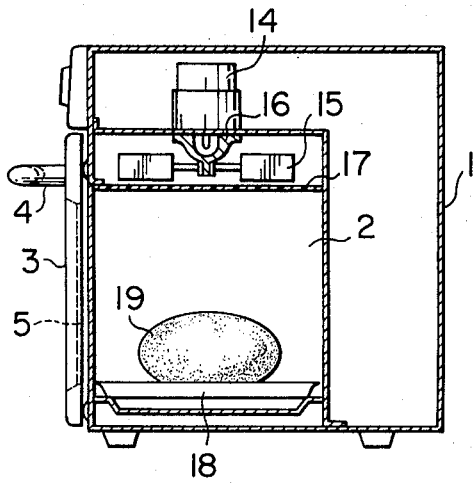
FIG. 2 shows a longitudinal section view of the oven.

A microwave oven is used to heat and cook the food by utilizing a high frequency wave of, for example, 2450 MHz. As shown in FIGS. 1 and 2, a body 1 includes a heating cavity 2 therein and has a door 3 mounted thereto for opening and closing a front opening of the heating cavity 2. The door 3 is provided with a door handle 4 for opening and closing the door and a view window 5 through which the inside of the heating cavity can be viewed. A control panel 6 is provided with a dial 8 at a position corresponding to a time dial plate 7 of a timer, which dial 8 is used to set the heating time suitable for the type and quantity of the food. By turning a control disk 9, the food to be cooked is selected, and by setting a timer pointer 11 to the quantity of that particular food by turning a timer knob 10 optimum cooking can be effected. The numeral 12 designates a cook button and the numeral 13 designates a cook lamp which is turned on when a high frequency wave is generated.

Provided at the top of the heating cavity 2 are a magnetron 14 for radiating a high frequency wave to the heating cavity, a stirrer vane 15 rotated by the air flow used to cool the magnetron 14 and stir the high frequency wave in the heating cavity, a stirrer shaft 16 for supporting the stirrer vane 15 and a partition plate 17 for isolating the stirrer vane section from the cooking section. Provided at the bottom of the heating cavity is a receiving disk 18 or the like on which an article 19 to be cooked is placed.

The present invention will now be described in detail in connection with the microwave oven of the above construction.

Figure 3:
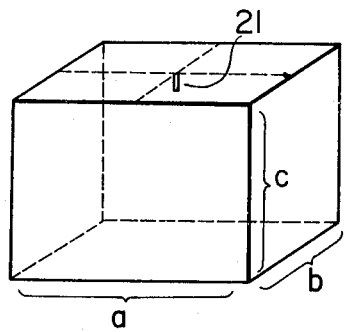
FIG. 3 is a perspective view of the oven regarded as a cavity resonator of rectangular parallelepiped structure.

Referring to FIG. 3 where the width, depth and height of the oven are represented by $a$, $b$ and $c$ respectively, resonant wavelength $\lambda$ of the mode oscillating in the oven is generally given by the expression:

$$\lambda = \frac{2}{\sqrt{(\frac{m}{a})^2 + (\frac{n}{b})^2 + (\frac{l}{c})^2}} \quad (1)$$

where $m$, $n$ and $l$ are any integers representing the standing wave number (which correspond to the number of modes) in the directions of width, depth and height, respectively.

The numeral 21 designates an antenna of the magnetron mounted at the lateral and longitudinal center of the oven.

It is seen from the expression (1) that when the wave number $l$ in a vertical direction is set to zero no standing wave is generated in the vertical direction and the electric field strength is uniform. This is an ideal condition for heating a tall article such as milk in a bottle, "sake" in a bottle or the like. It has also been proved from the experimental data shown in the Table that a high conversion efficiency was obtained when $l$ was set to zero.

Table

| Width in mm | 270 | 280 | 290 | 300 |
|---|---|---|---|---|
| Mode, Oscillation Frequency in MHz | (340) 2446.5<br>(421) 2469.9<br>(Δ332) 2454.0<br>(303) 2453.1<br>(014) 2441.4<br>(104) 2463.5 | (402) 2456.0<br>(Δ313) 2454.3<br>(014) 2441.4<br>(104) 2459.1 | (250) 2446.3<br>(430) 2466.8<br>(341) 2444.5<br>(412) 2433.3<br>(014) 2441.4<br>(104) 2455.1 | (250) 2452.0<br>(233) 2458.5<br>(014) 2441.4<br>(104) 2451.5 |
| Efficiency in % | 24 | 28 | 30 | 39 |
|  | 305 | 311 | 315 | 321 |
|  | (250) 2445.3<br>(500) 2459.0<br>(431) 2456.5<br>(233) 2451.9<br>(014) 2441.4<br>(104) 2460.0 | (250) 2437.8<br>(*510) 2452.8<br>(422) 2442.1<br>(233) 2444.4<br>(014) 2441.4<br>(104) 2448.0 | (260) 2433.0<br>(501) 2455.4<br>(233) 2439.6<br>(323) 2466.3<br>(014) 2441.4<br>(104) 2446.8 | (Δ511) 2453.5<br>(233) 2432.7<br>(323) 2451.0<br>(014) 2441.4<br>(104) 2445.1 |
|  | 45 | 51 | 43 | 38 |

*The wave numbers in the directions of width and depth are odd and the wave number in the direction of height in zero.
ΔThe wave numbers in the directions of width and depth areodd and the wave number in the direction of height is a positive integer.

The Table shows the modes, oscillation frequencies and conversion efficiencies in the oscillation frequency range of 2450 ± 20 MHz for an oven of 335 mm in depth and 250 mm in height with width being varied. In the Table, comparing the conversion efficiencies where the wave numbers ($m$, $n$) in the directions of width and depth are odd and the wave number $l$ in the direction of height is zero and where the wave numbers ($m$, $n$) in the directions of width and depth are odd and the wave number $l$ in the direction of height is a positive integer, it is seen that the former exhibits much higher conversion efficiency. The measurement was effected at a fixed input condition without the reflecting plate and the stirrer vane, using a power supply having a nominal output of 600 W. In the Table, the * mark indicates the zero mode while the Δ mark indicates the positive integer mode in the direction of height.

By substituting the wave number $l$ in the direction of height with zero ($l = 0$) and $\lambda$ with $Co/f$ ($\lambda = Co/f$), formula (1) can be expressed as follows;

$$\left(\frac{m}{a}\right)^2 + \left(\frac{n}{b}\right)^2 = \left(\frac{2f}{Co}\right)^2 \quad (2)$$

Figure 4:
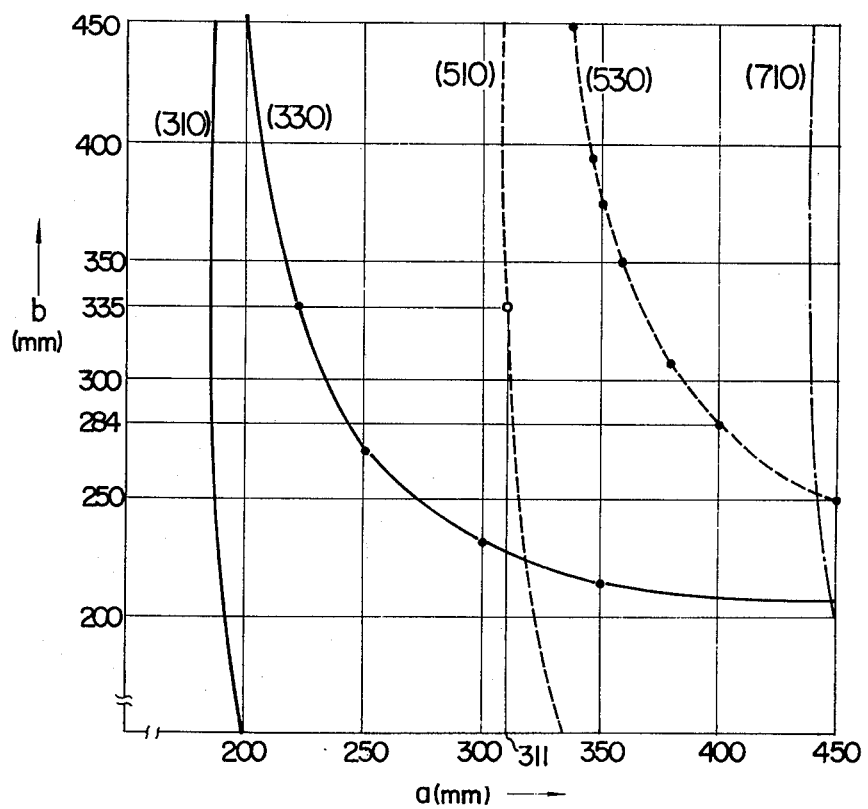
FIG. 4 is a chart showing the relation of width and depth for producing various modes when the oscillation frequency is at 2455 MHz, the standing wave number in the vertical direction is zero and the wave numbers in the directions of depth and width are odd.

The relation between $a$ and $b$ where the velocity of light $Co$ equals $3 \times 10^8$ m, the center frequency $f$ of the magnetron is 2455 MHz in formula (2) and $m$ and $n$ are selected to be odd numbers, is shown in FIG. 4. The reason for selecting odd numbers for $m$ and $n$ is that maximum conversion efficiency is obtained when the magnetron is mounted at the lateral and longitudinal center of the oven and an anti-node of the standing wave coincides with the mounting position of the magnetron.

The mode indications in the Table and FIG. 4, such as (330) or (510) represent the wave numbers ($m$, $n$, $l$) in the directions of width, depth and height. While m represents the wave number in the direction of width and $n$ in the direction of depth, they may be inverted in a practical application.

Figure 6:
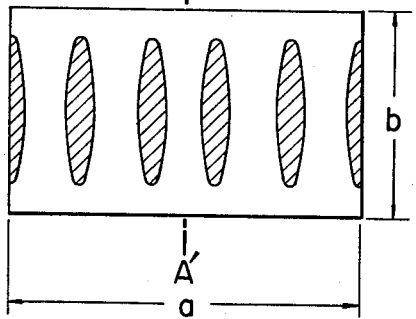
FIG. 6 shows a heating pattern in a horizontal plane in the oven.
Figure 7:
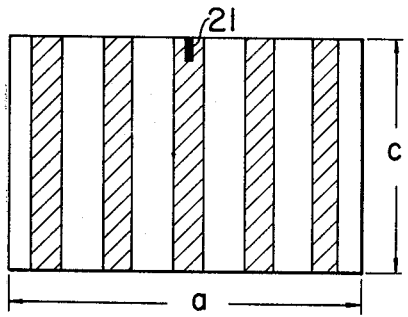
FIG. 7 shows a heating pattern in a vertical plane looking from the front of the oven.

The electric field distribution in an oven in which the wave number in the direction of height $c$ is zero while one wave is generated in one of the width direction $a$ and depth direction $b$ and an odd wave number in the other direction will now be explained in conjunction with FIGS. 5 to 7 based on the experiments.

As a simple example assume that the width is 311 mm, the depth is 335 mm and the height is 250 mm. From FIG. 4, the mode (510) is produced. That is, five waves each corresponding to a positively going half-wave are produced in the direction $a$ of the width, one half-wave is produced in the direction $b$ of the depth and no wave is produced in the direction $c$ of the height. A tray was inserted in the oven and a paper impregnated with an aqueous solution of cobalt chloride or a thin plane load made of kneaded dog-tooth violet starch was placed on the tray, and the heating pattern was observed. As seen from FIG. 6, which shows the electric field intensity distribution in a horizontal plane, heating occurs at the nodes of the wave and hence it is considered that there occurs a short-circuit for the electric field at 22 in FIG. 5 by the plane load 24 and a strong electric field of magnetic wave is produced there. In a vertical plane, it was confirmed that as shown in FIG. 7, heating occured at the anti-node of the wave and a strong electric field of electromagnetic wave produced in the direction of 23 in FIG. 5. While a difference in heating occurs in the vertical direction by the distance from the magnetron, this is not illustrated in the drawing.

Five stripes appear on the cobalt chloride impregnated paper vertically placed at a position relatively distant from various electromagnetic field disturbing articles near the center inside the oven, although such stripes may sometimes not appear in said pattern, especially that horizontally placed. The dimensions illustrated in the above embodiment are based on a theoretical calculation assuming an oven in the shape of a rectangular parallelepiped made of a perfect conductor. Thus in an actual oven as manufactured the mode (510) might occur at a dimensional value slightly different from the above value and it can be confirmed by the above method.

Figure 5:
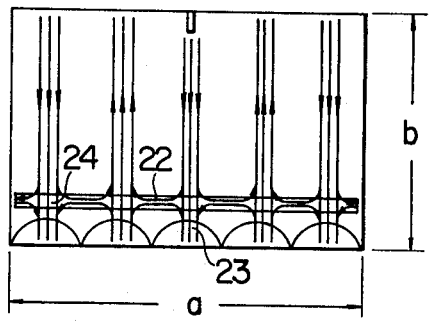
FIG. 5 shows an estimated direction of the electric field strength in the oven.

When food is placed in the oven the electric fields 22 and 23 of FIG. 5 are superimposed within the food and substantially uniform distribution is provided.

A particular embodiment in which a plurality of magnetrons are mounted symmetrically at front and back positions and left and right positions in the oven is now explained.

When an oven 400 mm in width and 284 mm in depth is selected, it is seen from FIG. 4 that mode (530) is generated. That is, five half-waves in the direction $a$ of width and three half-waves in the direction $b$ of depth are generated. Since no standing wave is generated in the direction of height a suitable dimension in the height can be selected. With these oven dimensions, the mounting positions of the magnetrons are at those cross points of the lines passing through the anti-nodes of the waves in the directions of $a$ and $b$ in FIG. 8 which are symmetrical with the directions $a$ and $b$ (lines A—A' and B—B'). That is, $X_{12}$ and $X_{52}$; $X_{22}$ and $X_{42}$; $X_{31}$ and $X_{33}$, $X_{12}$, $X_{32}$ and $X_{52}$; $X_{22}$, $X_{32}$ and $X_{42}$; $X_{31}$, $X_{32}$ and $X_{33}$; $X_{12}$, $X_{22}$, $X_{42}$ and $X_{52}$; $X_{11}$, $X_{13}$, $X_{51}$ and $X_{53}$; $X_{21}$, $X_{23}$, $X_{41}$ and $X_{43}$; $X_{12}$, $X_{52}$, $X_{31}$ and $X_{33}$; $X_{22}$, $X_{42}$, $X_{31}$ and $X_{33}$; $X_{12}$, $X_{22}$, $X_{32}$, $X_{42}$, and $X_{52}$; $X_{11}$, $X_{13}$, $X_{32}$, $X_{51}$ and $X_{53}$; $X_{21}$, $X_{23}$, $X_{32}$, $X_{41}$ and $X_{43}$; $X_{12}$, $X_{31}$, $X_{32}$, $X_{33}$ and $X_{52}$; $X_{22}$, $X_{31}$, $X_{32}$, $X_{33}$ and $X_{42}$; and $X_{11}$, $X_{13}$, $X_{22}$, $X_{42}$, $X_{51}$ and $X_{53}$ can be included.

The reason for selecting the mounting positions of the magnetrons at the anti-nodes of the standing waves is that maximum conversion efficiency is obtained at those positions.

Figure 8:
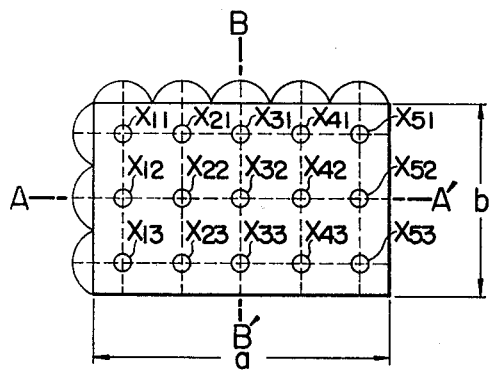
FIG. 8 shows the mounting positions of a plurality of magnetrons.
Figure 9:
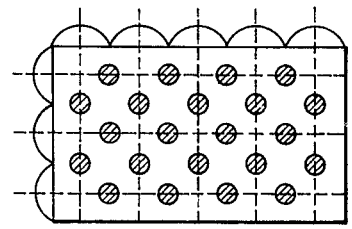
FIG. 9 shows a heating pattern when a mode (530) is produced.
Figure 10:
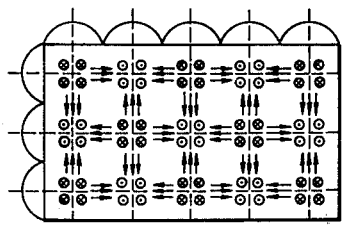
FIG. 10 is a chart showing a direction of electric field when a mode (530) is produced and a plane load is placed.

As a typical example, magnetrons were mounted at $X_{22}$ and $X_{42}$ in the oven in which a tray was inserted, on which a paper impregnated with a solution of cobalt chloride or a thin plane load comprising kneaded dogtooth violet starch was placed and heated for the measurement of the heating pattern, as shown in FIG. 9. FIG. 10 shows the directions of electric field ($\odot$ indicates upward direction and $\otimes$ indicates downward direction) under the above heating condition. It is considered that the electric field is short-circuited by the plane load and above that point the electric field in the direction of the arrow is established while below that point the electric field in the opposite direction to the arrow is established so that intense heating occurs. It has also been noted that in a vertical plane along the section A-A' in FIG. 8, five stripes similar to those in FIG. 7 appeared and in a vertical plane along the section B-B' three stripes appeared, and heating occured at the anti-nodes of the waves.

While such a pattern may not appear in a horizontal plane, five or three stripes appear in a cobalt chloride impregnated paper vertically disposed at a position relatively distant from various electric field disturbing articles, at the center of the oven. It should be understood that the dimensions illustrated in the above embodiment are based on theoretical calculation assuming an oven of rectangular parallelepiped structure made of a perfect conductor, and in an oven actually manufactured the mode (530) may appear when the dimensions are somewhat different from the above values. This can be confirmed by the above method.

Thus, by generating the mode (530) the horizontal electric field and the vertical electric field can be combined in a fixed volume of the food to provide a substantially uniform distribution.

Figure 11:
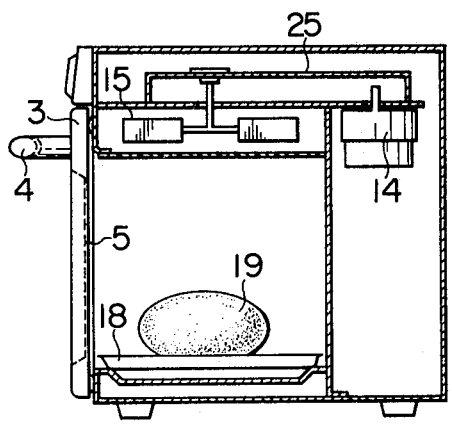
FIG. 11 is a longitudinal sectional view of a microwave oven fed by a waveguide.

While the magnetrons were directly mounted in the oven in the above embodiment, the same result will be attained when they are fed through waveguides. FIG. 11 shows an embodiment in which the oven shown in FIG. 3 is fed through a waveguide. The numeral 25 designates the waveguide.

Similarly, $X_{22}$ and $X_{42}$ in FIG. 8 may be fed through the waveguide.

It should be understood that by providing a stirring vane in the oven a uniform and fine distribution can be attained. Furthermore, by providing a turn table at the bottom of the oven, a similar effect can be expected. It is allowable to provide a certain projection or impression at the bottom of the oven to facilitate the insertion and removal of the tray although it more or less disturbs the electromagnetic field. The same is true for the mount of a partition plate for protecting the stirring vane. While FIG. 4 was illustrated under an ideal condition in that there exists no wall plane loss and the oven is of rectangular parallelepiped structure, it should be understood that the dimensions may somewhat vary depending upon the material of the oven, the manner of welding, the manner of corner bending, presence or absence of projections, the center frequency of the magnetron, etc.

What we claim is:

1. A microwave oven comprising an oven body, a heating cavity of generally rectangular parallelepiped structure, a door mounted at an opening of the heating cavity to close and open said opening, and a high frequency wave oscillator for supplying microwaves to the heating cavity, said heating cavity being arranged such that the microwaves are supplied thereto at the position which is substantially laterally and longitudinally symmetrical in the heating cavity, said heating cavity being dimensioned to meet the relation;

$$(\frac{m}{a})^2 + (\frac{n}{b})^2 = (\frac{2f}{Co})^2$$

so as to establish an electric field mode $m, n, O$, where $a$ is the width of the heating cavity, $b$ is the depth thereof, $m$ is the wave number in the direction of the width, $n$ is the wave number in the direction of the depth, and $m$ and $n$ are odd, $Co$ is the velocity of light and $f$ is the oscillation frequency of the oscillator, a uniform electric filed distribution thereby being established within said heating cavity.

2. A microwave oven according to the claim 1, wherein a high frequency wave oscillator is mounted at substantially the lateral and longitudinal center of the heating cavity, and the heating cavity is so dimensioned to establish an electric field mode in which the wave number in the direction of height in the heating cavity is zero and the wave numbers are odd in the directions of width and depth.

3. A microwave oven according to claim 1, wherein a plurality of high frequency wave oscillators are mounted at positions which are generally laterally longitudinally symmetrical in the heating cavity, and wherein no resonant mode waves are generated in the heating cavity in the direction of height while odd numbers of resonant mode waves are generated in the directions of width and depth, and the anti-nodes of the standing waves lie at the positions of said oscillators.

4. A microwave oven according to claim 1, wherein an opening is provided at a generally lateral and longitudinal center of the heating cavity, said opening and the high frequency wave oscillator are coupled through a waveguide, and the heating cavity is so dimensioned that no resonant mode waves are generated in the heating cavity in the direction of height while odd numbers of resonant mode waves are generated in the directions of width and depth.

5. A microwave oven according to claim 1, wherein a plurality of openings are provided at positions generally laterally and longitudinally symmetrical in the heating cavity, the openings and the high frequency wave oscillators are coupled through waveguides, the heating cavity is so dimensioned that no resonant mode waves are generated in the heating cavity in the direction of height while odd numbers of resonant mode waves are generated in the direction of width and depth, and said openings are located at the antinodes of the standing waves generated in the heating cavity.

6. A microwave oven according to claim 1, wherein there are provided at least two feeding openings at the top or bottom of the heating cavity, said feeding openings being located at node positions of the standing wave generated in the heating cavity.

7. A microwave oven comprising an oven body, a heating cavity of generally rectangular parallelepiped structure, a door mounted at an opening of the heating cavity to close and open said opening, a high frequency wave oscillator for supplying microwaves to the heating cavity, and an electric wave stirring device for stirring electric waves in the heating cavity, said high frequency wave oscillator being located at a generally lateral and longitudinal center in the heating cavity, said electric wave stirring device being located underneath said oscillator and coaxially therewith, and being driven by a cooling air flow which is guided thereto after cooling said high frequency wave oscillator.

* * * * *